J. D. RAINS.
TWO ROW CORN HEADER.
APPLICATION FILED DEC. 4, 1915.
1,184,832.
Patented May 30, 1916.
3 SHEETS—SHEET 1.
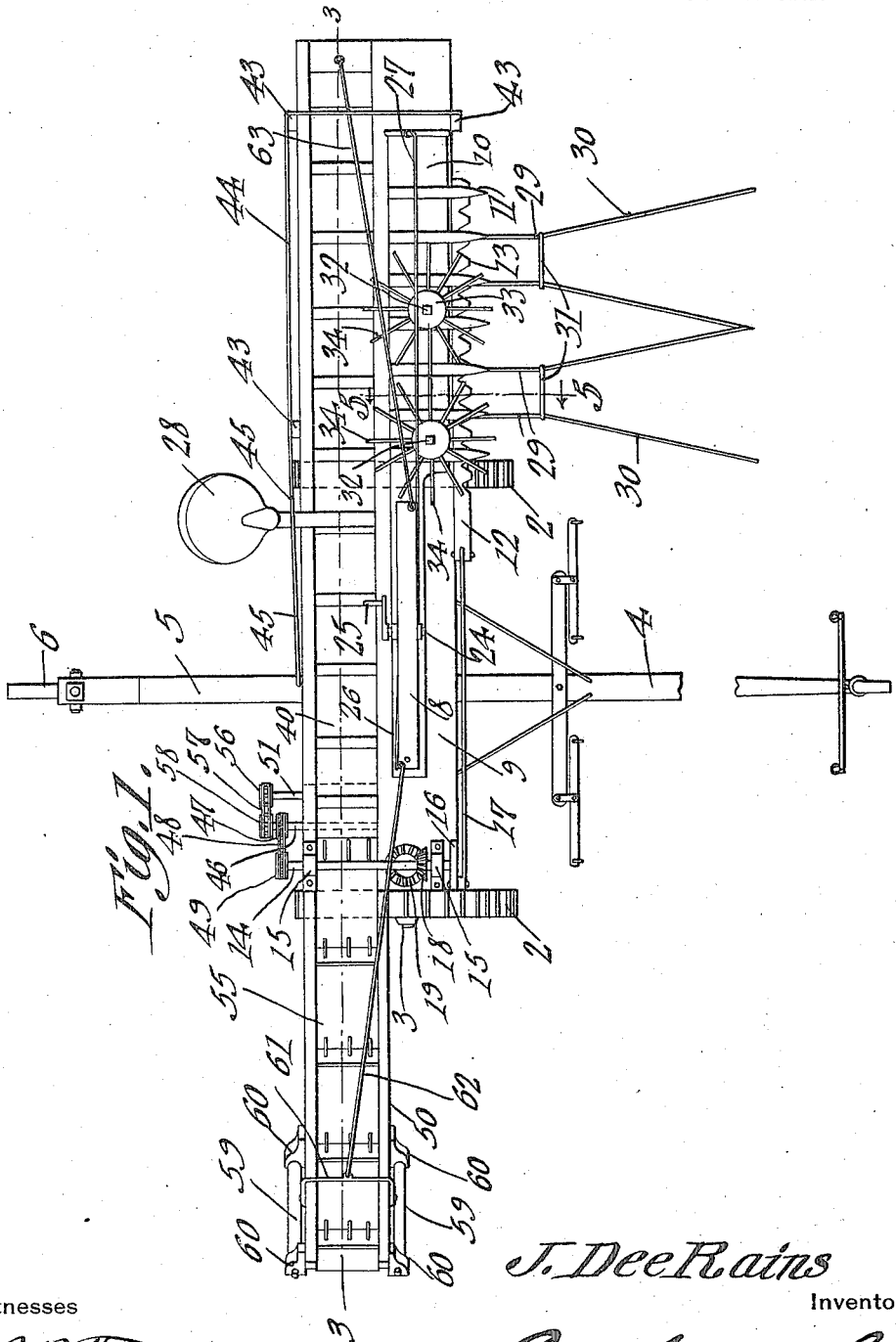
Witnesses
J. Dee Rains
Inventor
by
Attorneys

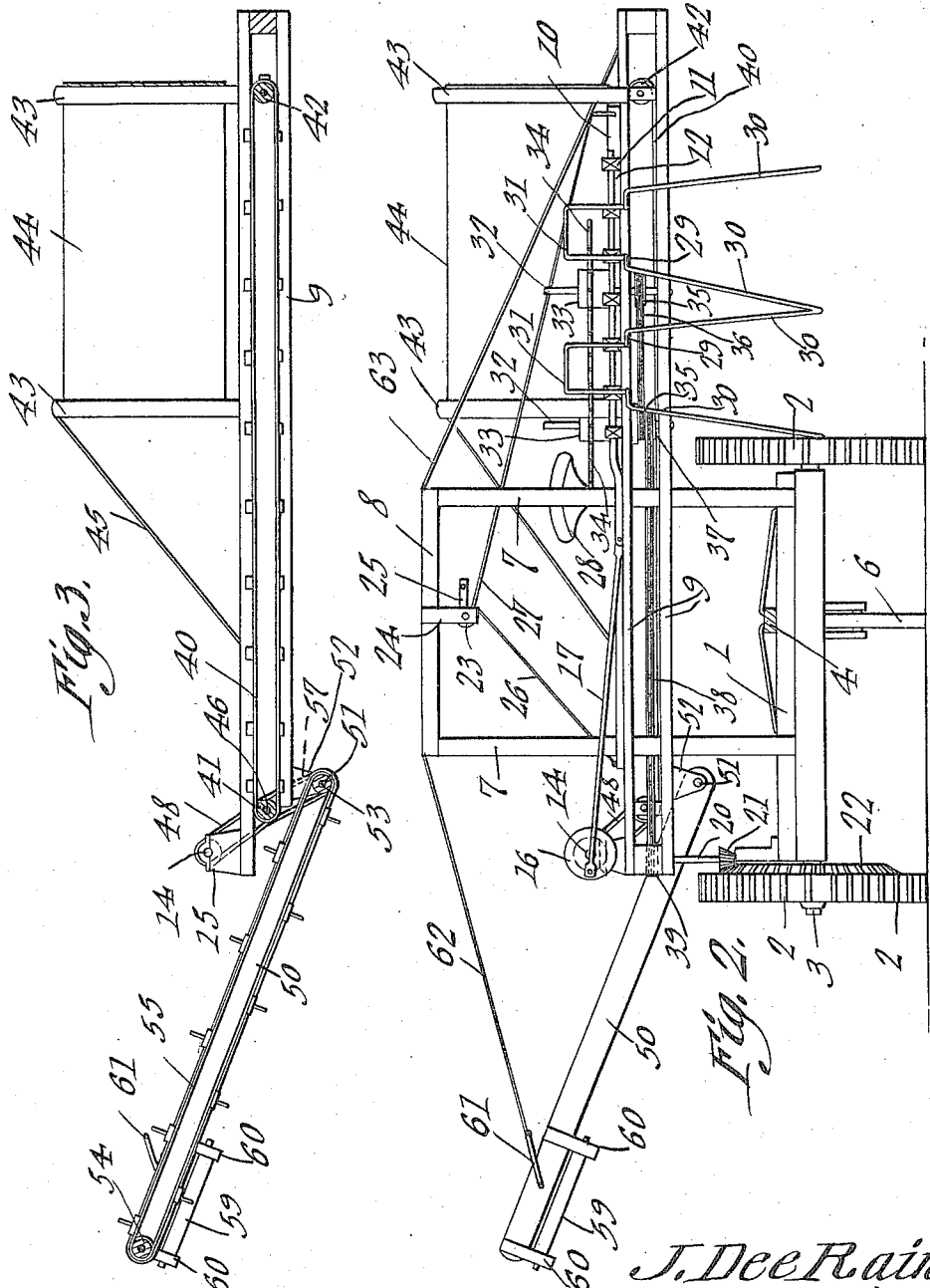

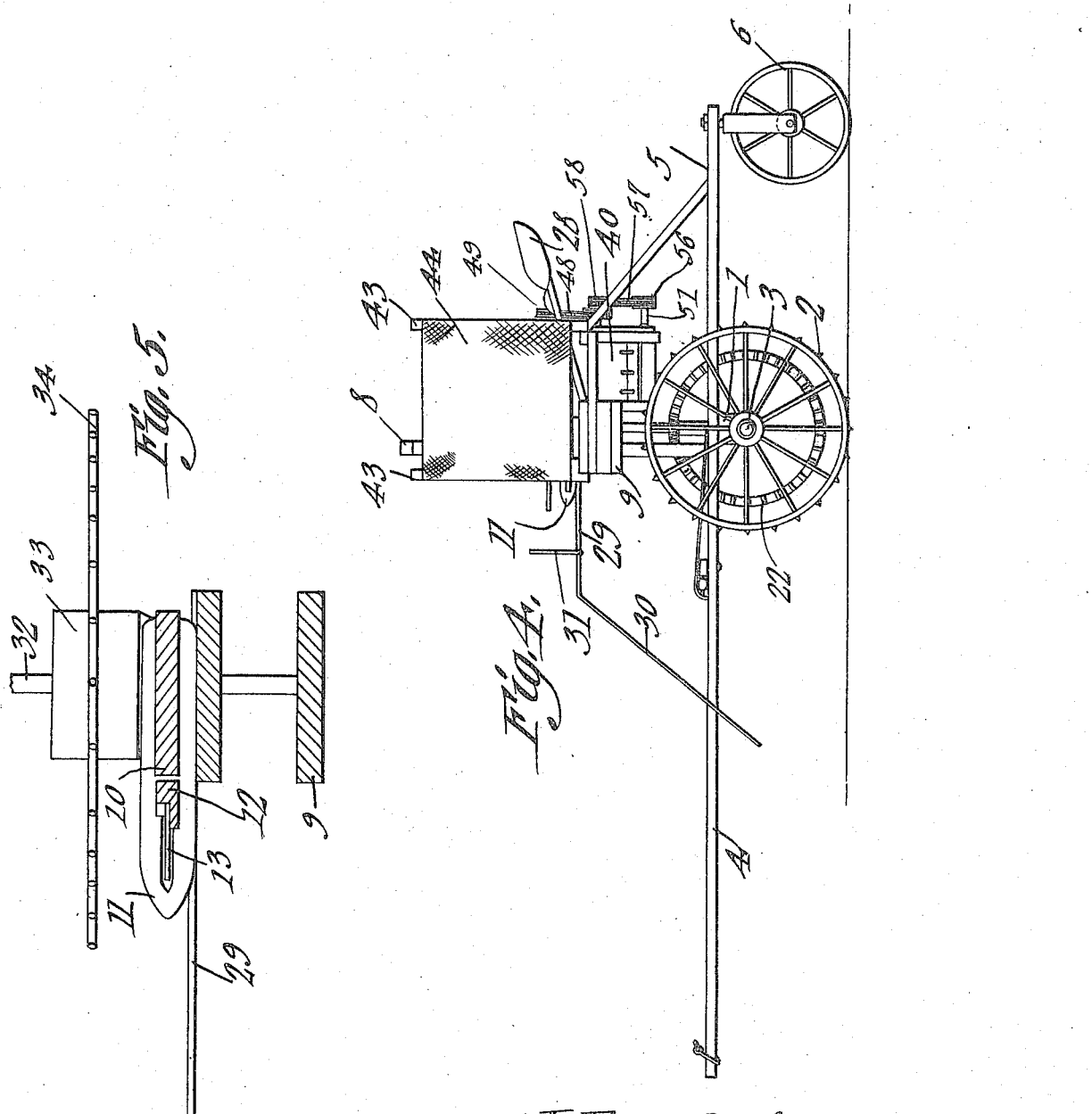

UNITED STATES PATENT OFFICE.

JAMES DEE RAINS, OF DEXTER, NEW MEXICO, ASSIGNOR OF ONE-THIRD TO HERMAN MENN AND ONE-THIRD TO BEE VAUGHN, BOTH OF DEXTER, NEW MEXICO.

TWO-ROW CORN-HEADER.

1,184,832.   Specification of Letters Patent.   Patented May 30, 1916.

Application filed December 4, 1915. Serial No. 65,061.

*To all whom it may concern:*

Be it known that I, JAMES DEE RAINS, a citizen of the United States, residing at Dexter, in the county of Chaves and State of New Mexico, have invented a new and useful Two-Row Corn-Header, of which the following is a specification.

The present invention appertains to corn headers or harvesters, and aims to provide a novel and improved machine of that character.

It is the object of the invention to provide a corn header which is operable for heading the tops of two rows simultaneously, the header having novel means for guiding the stalks to the cutting mechanism, and the cutting mechanism being adjustable vertically in order that corn stalks of various heights can be properly headed.

Another object of the invention is the provision of feeding devices for the cutting mechanism which are adjustable vertically with said mechanism to be operable properly at any adjusted position of the cutting mechanism.

The invention also includes means for conveying the heads to one side and for delivering them into a wagon or other receptacle.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of the machine, portions being broken away. Fig. 2 is a front view of the machine. Fig. 3 is a longitudinal section of the conveying mechanism taken on the line 3—3 of Fig. 1. Fig. 4 is a side elevation of the machine. Fig. 5 is an enlarged sectional detail on the line 5—5 of Fig. 1 illustrating the cutting mechanism.

In carrying out the invention, there is provided a truck 1 carrying a pair of driving wheels 2 adapted to run upon the ground, said wheels being secured to an axle 3 journaled to the frame of the truck. The truck has a forwardly projecting tongue 4 to which the draft animals can be hitched, and said truck has a rearwardly projecting extension 5 carrying a caster 6 which assists in properly supporting the machine upon the ground. The truck 1 has a pair of transversely spaced standards 7 connected at their upper ends by a yoke 8, and a transverse frame 9 is secured to the standards 7 between their ends and projects to one side of the truck, as clearly seen by reference to Fig. 2. The laterally projecting portion of the horizontal frame 9 has mounted thereon the cutting mechanism or sickle which embodies a transverse finger bar 10 above the forward edge portion of the frame 9, and mounted for vertical sliding movement upon the standards 7. The bar 10 has forwardly projecting fingers 11 which are slotted for the sliding reception of a transverse cutter bar 12 having forwardly projecting cutters 13 working within the fingers 11 in the manner of an ordinary mowing machine sickle.

In order to operate the cutter bar 12, a transverse shaft 14 is journaled within bearings 15 secured upon that end of the frame 9 remote from the sickle, and the forward end of the shaft 14 has a crank disk 16 which is connected by a pitman or connecting rod 17 with the respective end of the cutter bar 12. Thus, when the shaft 14 is rotated, the cutter bar will be reciprocated. This shaft 14 is operatively connected with the ground wheels 2 whereby the forward movement of the machine will result in the operation of the sickle, and to this end, a bevel gear 18 secured upon the shaft 14 meshes with a bevel gear 19 secured upon the upper end of a vertical shaft 20 journaled through the frame 9 below the shaft 14. Secured to the lower end of the shaft 20 is a bevel gear 21 which meshes with a relatively large bevel gear 22 secured to the inner side of one of the wheels 2, whereby when the wheels 2 rotate, the shaft 20 will be rotated to impart rotary movement to the shaft 14.

The sickle can be adjusted vertically bodily to accommodate corn stalks of various heights, and to this end a reel or drum 23 is carried for rotation by a hanger 24 attached to the yoke 8, and said reel has a hand crank 25 which can be rotated manually for raising and lowering the finger bar 10. Cables or flexible elements 26—27 are attached to the inner and outer ends of the bar 10 and are wound upon the reel 23, whereby the said reel in being rotated can wind up or pay out the cables 26—27 for raising or lowering the sickle, the sickle being guided for vertical movement by the standards 7. The operator seated upon the seat 28 carried by the frame 9 between the ends thereof can readily manipulate the crank 25 for adjusting the cutting mechanism up and down while the machine is in operation.

In order to guide the corn stalks of two rows properly toward the sickle, two pairs of forwardly projecting guide fingers 29 are attached to the forward edge of the frame 9 below the sickle, and are provided with downwardly and forwardly divergent terminals 30 to pass upon the opposite sides of the rows of stalks, for guiding the stalks to the sickle. Furthermore, the terminals 30 will raise any stalks which have been blown or broken down toward one side, due to the inclination of the terminals 30. The fingers 29 of each pair are connected by a yoke 31 for strengthening them, the stalks passing under the yoke 31. The fingers 29 thus properly direct the stalks of the two rows to the sickle, in order that the stalks will be cut properly for heading them.

The feeding devices, there being two in number one for each row of stalks, embody laterally spaced vertical shafts 32 journaled to the frame 9 below the sickle and passing loosely through the finger bar 10 of the sickle. The feeders are in the form of star wheels having hubs 33 feathered or slidable vertically upon the shafts 32 and constrained to rotate with said shafts. Each of the hubs 33 has a relatively large number of radial arms 34 which project at one side into the path of the stalks between the respective fingers 29. When the shafts 32 are rotated, the feeders will be rotated correspondingly to carry the stalks individually rearward so that their heads will be cut off and fed rearwardly in a most effective manner. The hubs 33 seat upon the bar 10, and when the bar 10 is raised and lowered, the feeders will be raised and lowered therewith. The feeders are thus disposed in the same relation with the sickle at all vertical adjustments thereof.

The feeders are also operated from the ground wheels, and to this end sprocket wheels 35 are secured upon the shafts 32 within the frame 9 and are connected by an endless sprocket chain 36. A sprocket wheel 37 is secured upon one of the shafts 32 and is connected by an endless sprocket chain 38 with a sprocket wheel 39 secured upon the shaft 20. It will therefore be apparent that when the shaft 20 is operated by the ground wheels, the shafts 32 will also be rotated for operating the feeders when the sickle is operated.

The frame 9 carries a conveyer movable transversely of the machine or longitudinally of the frame 9, said conveyer embodying an endless conveyer belt 40 mounted upon a pair of rollers 41—42 carried by the frame 9 adjacent the opposite ends thereof. The conveyer is disposed immediately in rear of the sickle in order that the heads will fall onto the conveyer. Posts 43 are attached to the frame 9, and carry a guard 44 whereby the heads are held in place upon the conveyer as the heads fall rearwardly, said guard preventing the loss of the heads. The inner post 43 is preferably connected by a brace 45 with the frame 9 to render the guard rigid.

The shaft 46 of the roller 41 which is disposed at that end of the frame 9 remote from the sickle is connected with the ground wheels, so that the conveyer will be operated simultaneously with the sickle and feeders. Thus, a sprocket wheel 47 is secured upon the rear terminal of the shaft 46 and is connected by an endless sprocket chain 48 with a sprocket wheel 49 secured upon the rear end of the shaft 14. It will therefore be evident that when the shaft 14 is rotated, the conveyer will be operated also.

The machine also embodies a second conveyer or elevator for carrying the material from the delivery end of the above conveyer to a wagon or other receptacle moved alongside of the machine. This elevator embodies an oscillatory frame 50 mounted for oscillation upon a shaft 51 journaled in hangers 52 secured to the frame 9 below the delivery end of the conveyer belt 40, a roller 53 being secured upon the shaft 51 within the frame 50, and a roller 54 being mounted within the free end of said frame. An endless elevator belt 55 is passed around the rollers 53—54, and is operated when the conveyer is actuated. Thus, a sprocket wheel 56 is secured upon the rear end of the shaft 51 and is connected by an endless sprocket chain 57 with a sprocket wheel 58 secured upon the rear end of the shaft 46.

A pair of rollers 59 are terminally journaled in depending bearings 60 carried by the side members of the frame 50 adjacent the free end thereof, and said rollers 59 are adapted to rest upon one side of a wagon or other receptacle, for supporting the free end of the elevator frame 50, in order that the material will be discharged from the elevator into the wagon or other receptacle. This allows the wagon to be run under the discharge end of the elevator, and after one wagon is filled, it can be withdrawn and replaced by another wagon. The frame 50 is also supported by means of a bail 61 attached thereto adjacent its free end and connected by a cable 62 with the yoke 8, said cable 62 being readily adjusted for raising and lowering the frame 50. The yoke 8 is also preferably connected by a brace 63 with the projecting end of the frame 9 to assist in supporting said end of the frame.

The present machine enables two rows of corn stalks to be headed simultaneously, and is operable in a practical and efficient manner, the corn stalks being guided to the sickle by means of the fingers 29, and the feeders forcing the heads rearwardly past the sickle and onto the conveyer from which the heads are carried to the wagon or receptacle at the remote side of the machine.

Having thus described the invention, what is claimed is:

In a corn header, a frame, a vertically adjustable finger bar above said frame, a reciprocatory cutter bar carried by said finger bar, a vertical shaft journaled to said frame and projecting upwardly loosely through the finger bar, and a star wheel feeder feathered upon said shaft and seating upon said finger bar to be moved vertically therewith.

In testimony that I claim the foregoing as my own, I have hereto affixed my signature in the presence of two witnesses.

JAMES DEE RAINS.

Witnesses:
L. C. RAINS,
Mrs. C. H. MORGAN.

Copies of this patent may be obtained for five cents each, by addressing the "Commissioner of Patents, Washington, D. C."